US008602887B2

(12) United States Patent
Tardif et al.

(10) Patent No.: US 8,602,887 B2
(45) Date of Patent: Dec. 10, 2013

(54) SYNTHESIS OF INFORMATION FROM MULTIPLE AUDIOVISUAL SOURCES

(75) Inventors: John A. Tardif, Sammamish, WA (US); Kathryn Stone Perez, Kirkland, WA (US); Alex Aben-Athar Kipman, Redmond, WA (US); Dawson Yee, Medina, WA (US)

(73) Assignee: Microsoft Corporation, Redmond, WA (US)

( * ) Notice: Subject to any disclaimer, the term of this patent is extended or adjusted under 35 U.S.C. 154(b) by 643 days.

(21) Appl. No.: 12/792,961

(22) Filed: Jun. 3, 2010

(65) Prior Publication Data

US 2011/0300929 A1 Dec. 8, 2011

(51) Int. Cl.
*G06F 17/00* (2006.01)

(52) U.S. Cl.
USPC ................ 463/30; 463/31; 463/34; 463/40; 463/42

(58) Field of Classification Search
USPC .................................. 463/30, 31, 34, 40, 42
See application file for complete search history.

(56) References Cited

U.S. PATENT DOCUMENTS

| | | | |
|---|---|---|---|
| 4,676,613 A | 6/1987 | Collender | |
| 5,504,533 A | 4/1996 | Ito et al. | |
| 5,850,352 A | 12/1998 | Moezzi et al. | |
| 5,953,448 A * | 9/1999 | Liang | 382/154 |
| 6,183,367 B1 | 2/2001 | Kaji et al. | |
| 6,256,033 B1 | 7/2001 | Nguyen | |
| 6,306,039 B1 * | 10/2001 | Kaji et al. | 463/42 |
| 6,512,838 B1 | 1/2003 | Rafii et al. | |
| 6,539,931 B2 | 4/2003 | Trajkovic et al. | |
| 6,561,907 B2 | 5/2003 | Shimizu et al. | |
| 6,611,268 B1 | 8/2003 | Szeliski et al. | |
| 6,674,877 B1 | 1/2004 | Jojic et al. | |
| 6,950,534 B2 | 9/2005 | Cohen et al. | |
| 6,990,681 B2 | 1/2006 | Wang et al. | |
| 7,227,526 B2 | 6/2007 | Hildreth et al. | |

(Continued)

FOREIGN PATENT DOCUMENTS

| | | |
|---|---|---|
| CN | 101295206 | 10/2008 |
| CN | 101305401 | 11/2008 |
| WO | WO2009059065 | 5/2009 |
| WO | 2009108645 | 9/2009 |

OTHER PUBLICATIONS

Yuqin, "Feature Matching Algorithm of Moving Human Bodies", 2009 International Conference on Information Technology and Computer Science in Kiev, Ukraine, Jul. 25-26, 2009, pp. 217-220, vol. 2, IEEE Computer Society, Los Alamitos, CA, USA.

(Continued)

*Primary Examiner* — Michael Cuff
(74) *Attorney, Agent, or Firm* — Vierra Magen Marcus LLP

(57) ABSTRACT

A system and method are disclosed for synthesizing information received from multiple audio and visual sources focused on a single scene. The system may determine the positions of capture devices based on a common set of cues identified in the image data of the capture devices. As a scene may often have users and objects moving into and out of the scene, data from the multiple capture devices may be time synchronized to ensure that data from the audio and visual sources are providing data of the same scene at the same time. Audio and/or visual data from the multiple sources may be reconciled and assimilated together to improve an ability of the system to interpret audio and/or visual aspects from the scene.

20 Claims, 9 Drawing Sheets

(56) References Cited

U.S. PATENT DOCUMENTS

| | | |
|---|---|---|
| 7,308,112 B2 | 12/2007 | Fujimura et al. |
| 7,317,836 B2 | 1/2008 | Fujimura et al. |
| 7,367,887 B2 | 5/2008 | Watabe et al. |
| 7,376,333 B2 | 5/2008 | Chung et al. |
| 7,492,367 B2 | 2/2009 | Mahajan et al. |
| 7,590,262 B2 | 9/2009 | Fujimura et al. |
| 7,627,139 B2 | 12/2009 | Marks et al. |
| 7,671,894 B2 | 3/2010 | Yea et al. |
| 7,703,044 B2 * | 4/2010 | Graham ............. 715/838 |
| 7,704,135 B2 | 4/2010 | Harrison, Jr. |
| 8,094,928 B2 * | 1/2012 | Graepel et al. ........... 382/154 |
| 2006/0075422 A1 | 4/2006 | Choi et al. |
| 2007/0110338 A1 * | 5/2007 | Snavely et al. ........... 382/305 |
| 2008/0026838 A1 | 1/2008 | Dunstan et al. |
| 2008/0143821 A1 * | 6/2008 | Hung et al. ............. 348/36 |
| 2008/0152191 A1 | 6/2008 | Fujimura et al. |
| 2008/0252596 A1 | 10/2008 | Bell et al. |
| 2009/0066784 A1 | 3/2009 | Stone et al. |
| 2009/0077504 A1 | 3/2009 | Bell et al. |
| 2009/0141933 A1 | 6/2009 | Wagg |
| 2009/0215533 A1 | 8/2009 | Zalewski et al. |
| 2009/0221368 A1 | 9/2009 | Yen et al. |
| 2010/0093435 A1 | 4/2010 | Glaser et al. |
| 2011/0021257 A1 * | 1/2011 | Lundback et al. ............. 463/2 |

OTHER PUBLICATIONS

Qian, et al., "A Gesture-Driven Multimodal Interactive Dance System," 2004 IEEE International Conference on Multimedia and Expo (ICME), 2004, pp. 1579-1582.

Shivappa, et al., "Person Tracking With Audio-visual Cues Using The Iterative Decoding Framework," IEEE 5th International Conference on Advanced Video and Signal Based Surveillance, 2008, pp. 260-267.

Toyama, et al., "Probabilistic Tracking in a Metric Space," Eighth International Conference on Computer Vision, Vancouver, Canada, vol. 2, Jul. 2001, 8 pages.

English Abstract for CN101295206 published Oct. 29, 2008.

English Abstract for CN101305401 published Nov. 12, 2008.

First Office Action dated Jun. 8, 2013 in Chinese Patent Application No. 201110161330.5.

Response to First Office Action filed Oct. 21, 2013 in Chinese Patent Application No. 201110161330.5.

English language Summary of Response to First Office Action filed Oct. 21, 2013 in Chinese Patent Application No. 201110161330.5.

* cited by examiner

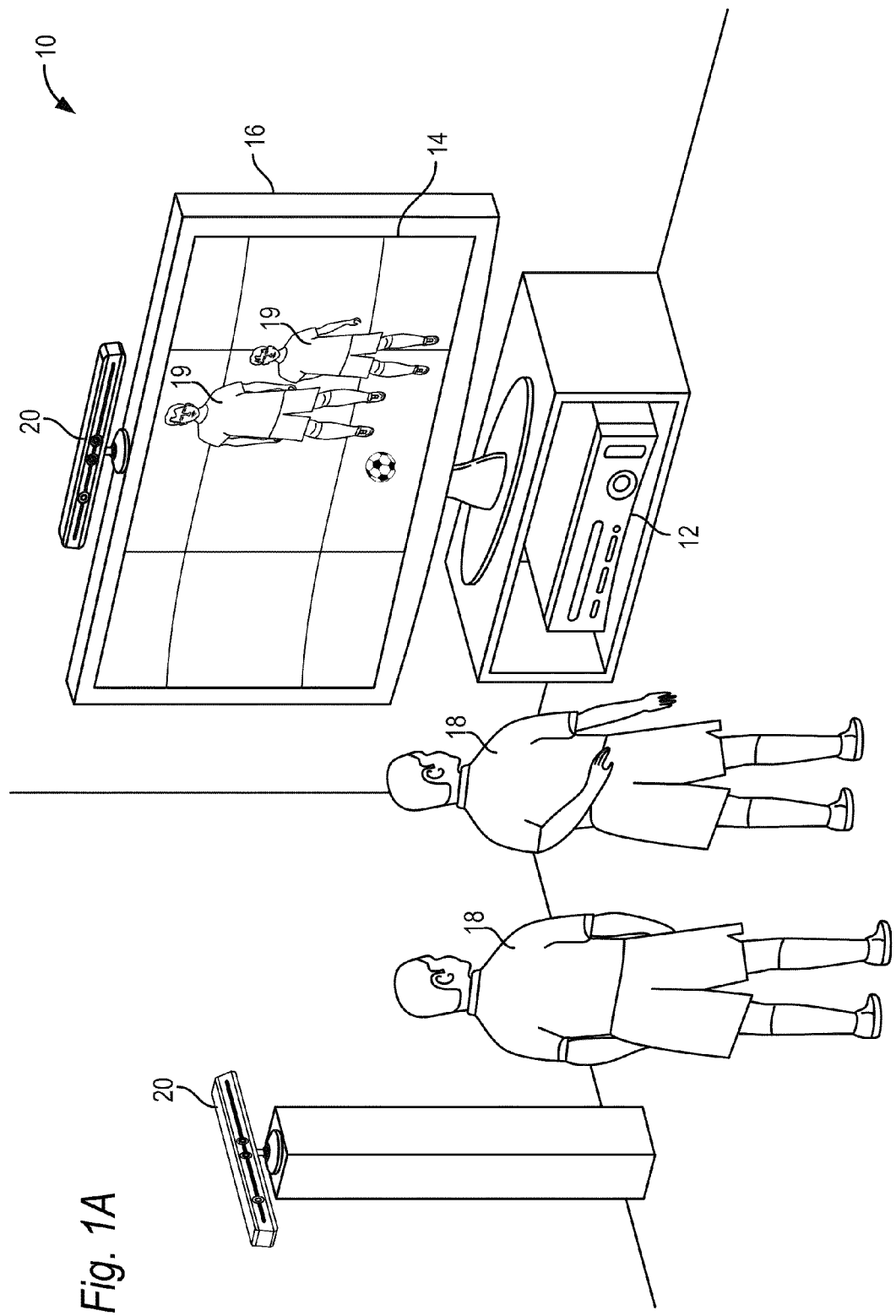

(Step 402)*

(Step 404)*

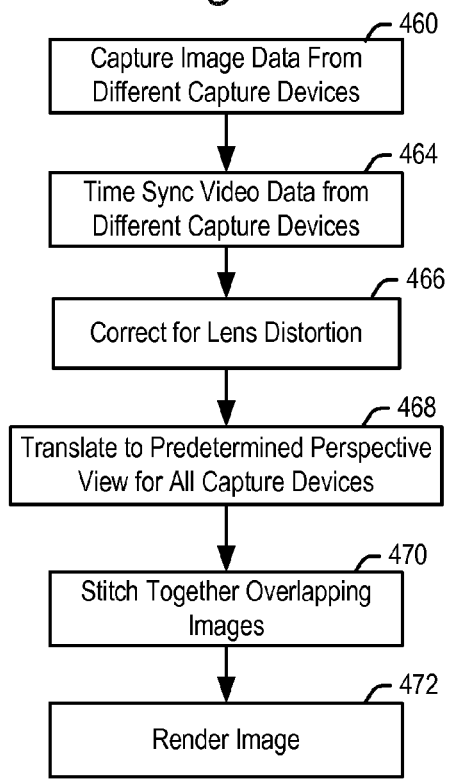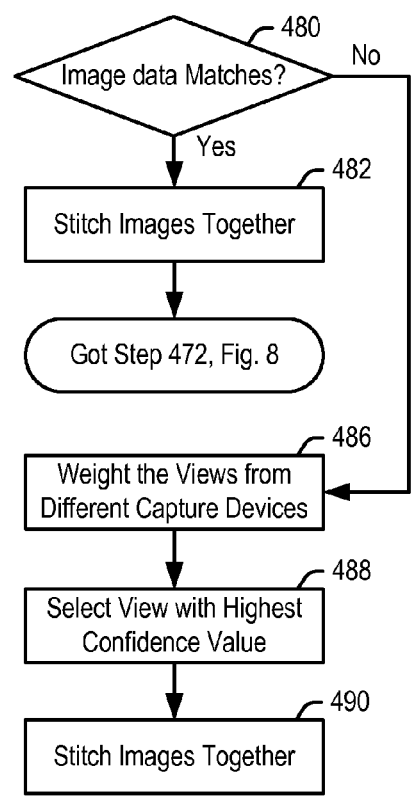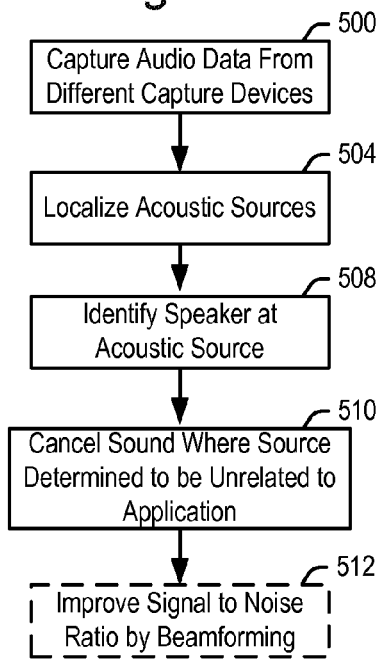

SYNTHESIS OF INFORMATION FROM MULTIPLE AUDIOVISUAL SOURCES

BACKGROUND

In the past, computing applications such as computer games and multimedia applications used controllers, remotes, keyboards, mice, or the like to allow users to manipulate game characters or other aspects of an application. More recently, computer games and multimedia applications have begun employing cameras and software gesture recognition engines to provide a natural user interface ("NUI"). With NUI, a capture device is used to detect user movements, gestures and speech. The associated audio and visual data is forwarded to a processor which interprets the data and uses it to control game characters or other aspects of an application.

Current NUI systems may use a single capture device to register data from a play space or scene. However, it may be desirable to increase the size of the play space or scene. Use of a single capture device in this case may be inadequate for a number of reasons, such as for example inadequate resolution or illumination of the scene, or occlusion of objects within the scene. For such cases, it would be advantageous to use more than one capture device. There is a need for a system to synthesize data from multiple capture devices viewing a common scene to reconcile the data from the multiple sources.

SUMMARY

Disclosed herein is a system for synthesizing information received from multiple audio and visual sources focused on a single scene. The system may include a computing environment receiving data from two or more sources. The sources may be capture devices for capturing audio and/or visual data from a play space or scene. Embodiments of the present technology initially calibrate the capture devices to each other and to the scene. A scene may often have users and objects moving into and out of the scene. Thus, a first phase of the calibration process may include time synchronizing the data from the multiple capture devices to ensure that data from the audio and visual sources are providing data of the same scene at the same time.

Thereafter, the capture devices may be calibrated to each other by identifying key-point discontinuities, or cues, within the image data of the various capture devices. The relative positions of two or more capture devices to each other may then be determined by identifying a number of cues that are common to the images of two or more capture devices. This process is repeated until the positions of all the capture devices have been calibrated with respect to each other.

Thereafter, visual data from the multiple capture devices may be reconciled and stitched together to improve an ability of the system to sense and interpret visual aspects from the scene. Similarly, once the positions of the different capture devices are calibrated, audio data from the multiple capture devices may provide improved audio quality, noise reduction and acoustic source localization.

An embodiment of the present technology may relate to a method for synthesizing information for a scene from multiple sources. The method includes the steps of: a) receiving scene information from a first source and a second source, the first and second sources spatially separated from each other and the scene; b) determining a position for each of the first and second sources from the scene information and one or more cues detected in common from the scene by the first and second sources; and c) creating a representation of the scene based on the positions of the first and second sources determined in said step b) and the scene information received from the first and second sources.

A further embodiment of the present technology may relate to a method for synthesizing information for a scene from multiple sources, including the steps of: a) receiving scene information from a first source and a second source, an initial position of the first source being unknown with respect to the second source, the first and second sources spatially separated from each other and the scene, the scene information including at least one of image depth data and RGB data; b) determining a position for each of the first and second sources from at least one of the image data and RGB data, together with the scene information shared in common from the scene by the first and second sources; and c) creating a representation of the scene based on the positions of the first and second sources determined in said step b) and the scene information received from the first and second sources.

A further embodiment of the present technology may relate to a method for synthesizing information for a play space in a gaming application from multiple capture devices, capture devices in the multiple capture devices including a depth camera, an RGB camera and at least one microphone. The method may include the steps of: a) receiving image depth data and RGB depth data from a first capture device and a second capture device, the image depth data and the RGB depth data from the first and second capture devices being time synchronized together, the first and second capture devices spatially separated from each other and the play space; b) determining a position and orientation for each of the first and second capture devices from a combination of the synchronized image depth data and RGB data, together with a plurality of cues detected in common from the play space by the first and second capture devices; c) creating a representation of the play space based on the positions of the first and the second capture devices determined in said step b) and the image depth data and RGB depth data received from the first and second capture devices; d) stitching together a first portion of the play space representation from the first capture device with a second portion of the play space representation from the second capture device; and e) rendering the representation of the play space on a display associated with the first and second capture devices.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. Furthermore, the claimed subject matter is not limited to implementations that solve any or all disadvantages noted in any part of this disclosure.

BRIEF DESCRIPTION OF THE DRAWINGS

FIG. 1A illustrates an example embodiment of a target recognition, analysis, and tracking system with users participating in a game.

FIG. 8 is a flowchart for capturing data from multiple capture devices and synchronizing that data to render a representation of a scene.

FIG. 9 is a flowchart with further detail of a process for stitching together images.

FIG. 10 is a flowchart for the use of audio data from multiple capture devices.

DETAILED DESCRIPTION

Embodiments of the present technology will now be described with reference to FIGS. 1-10, which in general relate to a system for synthesizing information received from multiple audio and visual sources focused on a single scene. In embodiments, the system operates within a NUI system including two or more capture devices for capturing audio and/or visual data from a single play space or scene. As the locations of the capture devices may not generally be known, the positions and orientations of the capture devices relative to the scene and each other may be determined As a scene may often have users and objects moving into and out of the scene, data from the multiple capture devices may be time synchronized to ensure that data from the audio and visual sources are providing data of the same scene at the same time. Audio and/or visual data from the multiple sources may be reconciled and assimilated together to improve an ability of the system to interpret audio and/or visual aspects from the scene.

Figure 1B:
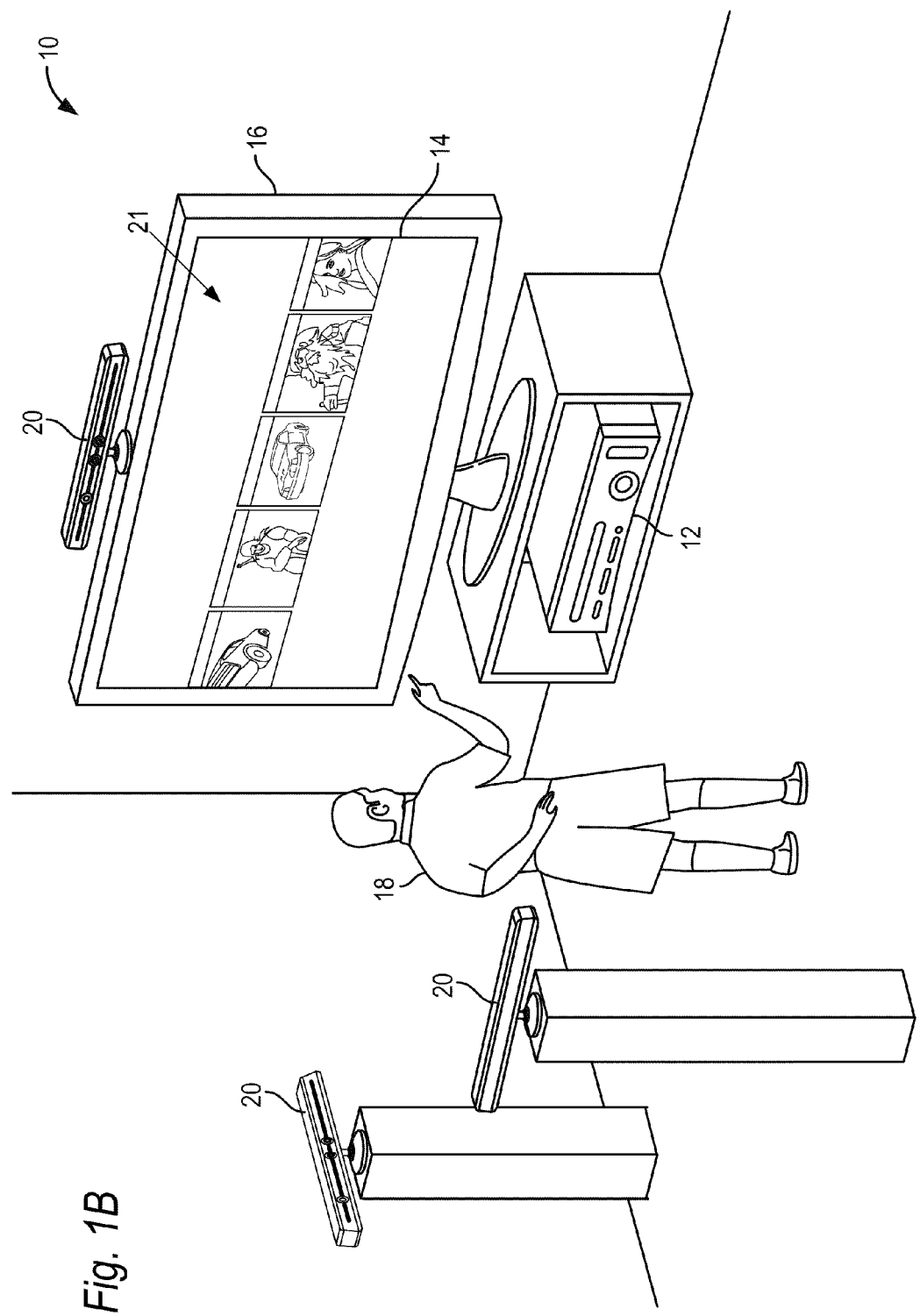
FIG. 1B illustrates a further example embodiment of a target recognition, analysis, and tracking system with a user operating a graphical user interface.
Figure 1C:
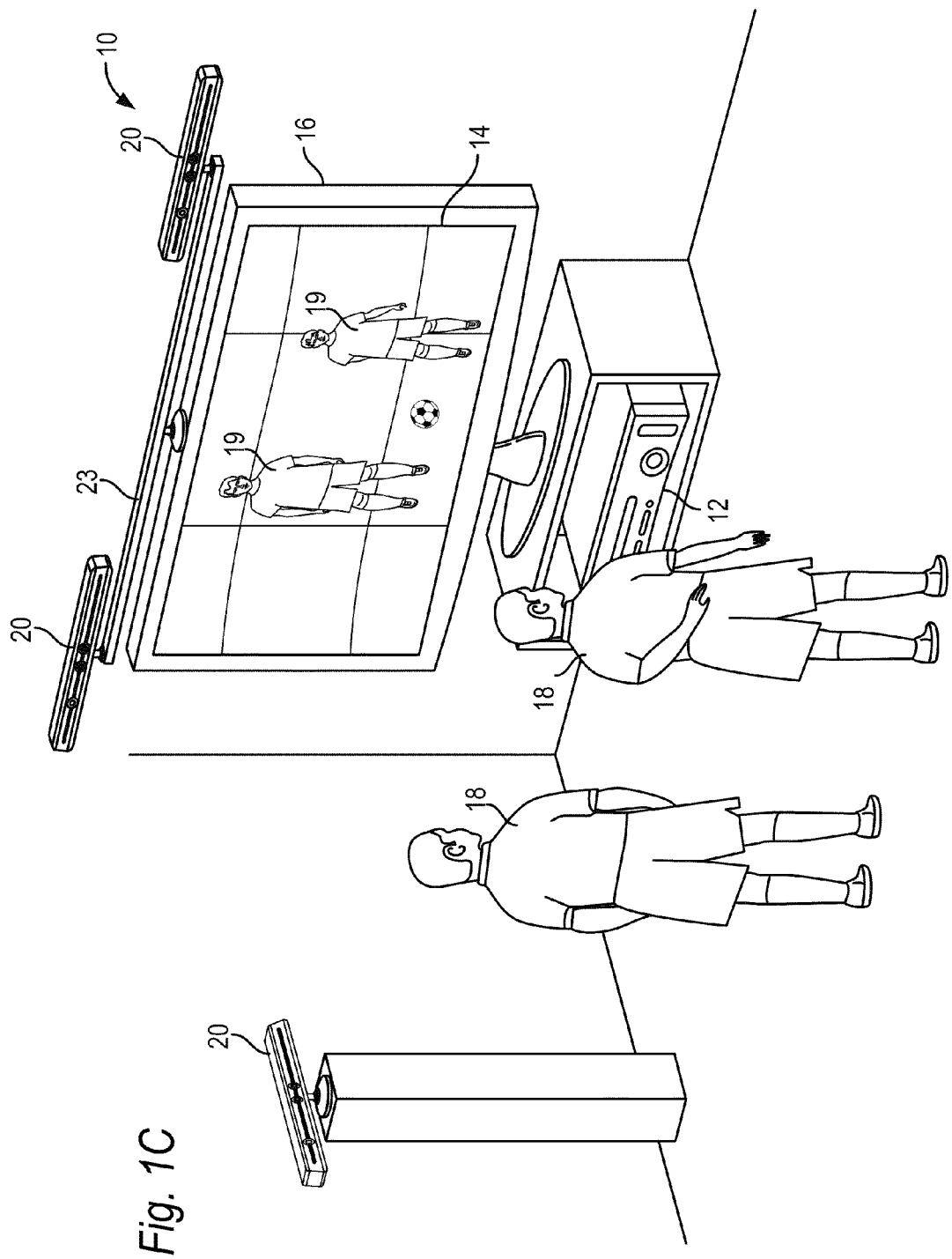
FIG. 1C illustrates a further example embodiment of a target recognition, analysis, and tracking system with users participating in a game.
Figure 2:
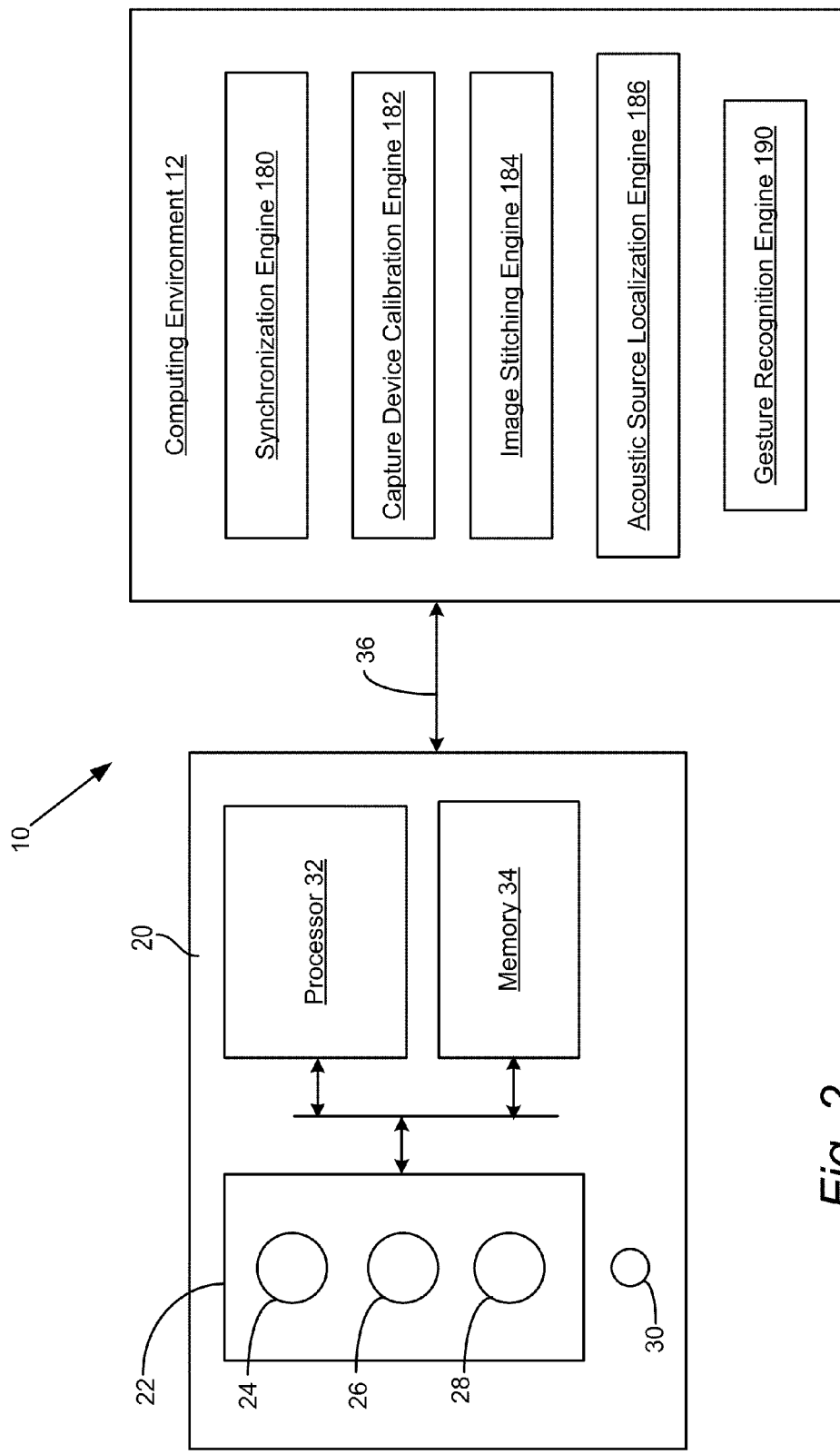
FIG. 2 illustrates an example embodiment of a capture device that may be used in a target recognition, analysis, and tracking system.

Referring initially to FIGS. 1A-2, the hardware for implementing the present technology includes a target recognition, analysis, and tracking system 10 which may be used to recognize, analyze, and/or track one or more human targets such as the users 18. Embodiments of the target recognition, analysis, and tracking system 10 include a computing environment 12 for executing a gaming or other application. The computing environment 12 may include hardware components and/or software components such that computing environment 12 may be used to execute applications such as gaming and non-gaming applications. In one embodiment, computing environment 12 may include a processor such as a standardized processor, a specialized processor, a microprocessor, or the like that may execute instructions stored on a processor readable storage device for performing processes described herein.

The computing environment may receive information from a plurality of sources, which in embodiments may be, or include, a plurality of capture devices 20. The capture devices 20 capture image and audio data relating to one or more users and/or objects sensed by the capture devices. In embodiments, the capture devices 20 may be used to capture information relating to movements, gestures and speech of one or more users, which information is received by the computing environment and used to render, interact with and/or control aspects of a gaming or other application. In embodiments, each of the capture devices 20 may be identical to each other, though they need not be in further embodiments. Examples of the computing environment 12 and capture devices 20 are explained in greater detail below.

Embodiments of the target recognition, analysis, and tracking system 10 may be connected to an audio/visual device 16 having a display 14. The device 16 may for example be a television, a monitor, a high-definition television (HDTV), or the like that may provide game or application visuals and/or audio to a user. For example, the computing environment 12 may include a video adapter such as a graphics card and/or an audio adapter such as a sound card that may provide audio/visual signals associated with the game or other application. The audio/visual device 16 may receive the audio/visual signals from the computing environment 12 and may then output the game or application visuals and/or audio associated with the audio/visual signals to the user 18. According to one embodiment, the audio/visual device 16 may be connected to the computing environment 12 via, for example, an S-Video cable, a coaxial cable, an HDMI cable, a DVI cable, a VGA cable, a component video cable, or the like.

In embodiments, the computing environment 12, the A/V device 16 and the capture devices 20 may cooperate to render one or more avatars or on-screen characters 19 on display 14. In embodiments, an avatar 19 mimics the movements of a corresponding user 18 in real world space so that the user 18 may perform movements and gestures which control the movements and actions of the avatar 19 on the display 14.

As shown in FIGS. 1A through 1C, one or more users 18 may be positioned so as to have their movements and/or speech captured by two or more capture devices 20. As used herein, a scene is the aggregate area captured by image and/or audio sensors of capture devices 20. A play space is a scene captured by capture devices 20 in the context of a gaming application running on computing environment 12.

FIG. 1A shows an embodiment including two capture devices 20 capturing a scene. FIG. 1B shows an embodiment including three capture devices 20 capturing a scene. It is understood that there may be more than three capture devices 20 in further embodiments. Each capture device 20 may be set up at an arbitrary position and orientation, and with a focal length, to capture at least a portion of a scene. In embodiments, each capture device may capture a part of a scene, with overlap between the multiple capture devices occurring only at one or more boundary regions. In further embodiments, a first capture device 20 may be zoomed into a specific area that is completely contained within, and is part of, a larger scene captured by one or more additional capture devices 20. In the embodiment shown in FIGS. 1A through 1C, the capture devices 20 are generally trained on a single area. However, it is understood that multiple capture devices may be used to capture larger scenes. In embodiments, two to four capture devices may be provided. At these numbers, a typical processor is able to receive and process all data without latency in an image rendered on the display 14. However, considerations such as processing speed aside, any number of capture devices may be used to capture portions of any sized scene in embodiments of the present technology.

The capture devices 20 may be positioned at any position with respect to a captured scene. FIG. 1A shows two capture devices at the front and to the side of a captured scene. FIG. 1B shows a third capture device 20 positioned behind a captured scene. As explained hereinafter, in embodiments, the positions of the different capture devices 20 relative to each other and a captured scene may be determined in accordance with the present technology, and need not be known when setting up the capture devices 20. In further embodiments shown for example in FIG. 1C, a general knowledge of the capture device positions relative to each other may be known. FIG. 1C shows a pair of capture devices fixed to a fixture 23 so that the spacing and orientation of the associated capture devices is generally known. This may reduce the processing required to calibrate capture device positions as explained below.

While the capture devices 20 in FIGS. 1A through 1C are generally aligned parallel and/or orthogonal to each other, this is by way of example only, and they need not be in further embodiments. Furthermore, any one of the capture devices 20 shown in FIGS. 1B and 1C may be omitted in further embodiments. Additional capture devices 20 may be used at further positions instead of, or in addition to, the capture devices shown in FIGS. 1A through 1C.

In FIGS. 1A and 1C, the capture devices 20 are used in a NUI system where for example a pair of users 18 are playing a soccer game. In this example, the computing environment 12 may use the audiovisual display 14 to provide a visual representation of two avatars 19 in the form of soccer players controlled by the respective users 18. A user 18 may move or perform a kicking motion in physical space to cause their associated player avatar 19 to move or kick the soccer ball in game space. Thus, according to an example embodiment, the computing environment 12 and the capture devices 20 may be used to recognize and analyze movements and gestures of the users 18 in physical space, and such movements and gestures may be interpreted as a game control or action of the user's associated avatar 19 in game space.

The embodiment of FIGS. 1A and 1C is one of many different applications which may be run on computing environment 12, and the application running on computing environment 12 may be a variety of other gaming and non-gaming applications. Moreover, the system 10 may further be used to interpret user 18 movements as operating systems and/or application controls that are outside the realm of games or the specific application running on computing environment 12. One example is shown in FIG. 1B, where a user 18 is scrolling through and controlling a user interface 21 with a variety of menu options presented on the display 14. Virtually any controllable aspect of an operating system and/or application may be controlled by the movements of the user 18.

Suitable examples of a system 10 and components thereof are found in the following co-pending patent applications, all of which are hereby specifically incorporated by reference: U.S. patent application Ser. No. 12/475,094 entitled "Environment And/Or Target Segmentation," filed May 29, 2009; U.S. patent application Ser. No. 12/511,850, entitled "Auto Generating a Visual Representation," filed Jul. 29, 2009; U.S. patent application Ser. No. 12/474,655, entitled "Gesture Tool," filed May 29, 2009; U.S. patent application Ser. No. 12/603,437, entitled "Pose Tracking Pipeline," filed Oct. 21, 2009; U.S. patent application Ser. No. 12/475,308, entitled "Device for Identifying and Tracking Multiple Humans Over Time," filed May 29, 2009; U.S. patent application Ser. No. 12/575,388, entitled "Human Tracking System," filed Oct. 7, 2009; U.S. patent application Ser. No. 12/422,661, entitled "Gesture Recognizer System Architecture," filed Apr. 13, 2009; U.S. patent application Ser. No. 12/391,150, entitled "Standard Gestures," filed Feb. 23, 2009; and U.S. patent application Ser. No. 12/474,655, entitled "Gesture Tool," filed May 29, 2009.

As indicated above, capture devices 20 may be the same or different in embodiments of the present technology. One example of a capture device 20 which may be used as any or all of the devices 20 shown will now be described with reference to FIG. 2. In an example embodiment, the capture device 20 may be configured to capture video having a depth image that may include depth values via any suitable technique including, for example, time-of-flight, structured light, stereo image, or the like. According to one embodiment, the capture devices may organize the calculated depth information into "Z layers," or layers that may be perpendicular to a Z axis extending from the depth camera along its line of sight. In further embodiments, the capture devices may organize the calculated depth information into vectors extending at different angles from the depth camera to a captured data point.

As shown in FIG. 2, each capture device 20 may include an image camera component 22. According to an example embodiment, the image camera component 22 may be a depth camera that may capture the depth image of a scene. The depth image may include a two-dimensional (2-D) pixel area of the captured scene where each pixel in the 2-D pixel area may represent a depth value such as a length or distance in, for example, centimeters, millimeters, or the like of an object in the captured scene from the camera.

As shown in FIG. 2, according to an example embodiment, the image camera component 22 may include an IR light component 24, a three-dimensional (3-D) camera 26, and an RGB camera 28 that may be used to capture the depth image of a scene. For example, in time-of-flight analysis, the IR light component 24 of the capture device 20 may emit an infrared light onto the scene and may then use sensors (not shown) to detect the backscattered light from the surface of one or more targets and objects in the scene using, for example, the 3-D camera 26 and/or the RGB camera 28.

In some embodiments, pulsed infrared light may be used such that the time between an outgoing light pulse and a corresponding incoming light pulse may be measured and used to determine a physical distance from the capture device 20 to a particular location on the targets or objects in the scene. Additionally, in other example embodiments, the phase of the outgoing light wave may be compared to the phase of the incoming light wave to determine a phase shift. The phase shift may then be used to determine a physical distance from the capture device 20 to a particular location on the targets or objects.

According to another example embodiment, time-of-flight analysis may be used to indirectly determine a physical distance from the capture device 20 to a particular location on the targets or objects by analyzing the intensity of the reflected beam of light over time via various techniques including, for example, shuttered light pulse imaging.

In another example embodiment, a capture device 20 may use a structured light to capture depth information. In such an analysis, patterned light (i.e., light displayed as a known pattern such as a grid pattern or a stripe pattern) may be projected onto the scene via, for example, the IR light component 24. Upon striking the surface of one or more targets or objects in the scene, the pattern may become deformed in response. Such a deformation of the pattern may be captured by, for example, the 3-D camera 26 and/or the RGB camera 28 and may then be analyzed to determine a physical distance from the capture device 20 to a particular location on the targets or objects.

According to another embodiment, each capture device 20 may include two or more physically separated cameras that may view a scene from different angles, to obtain visual stereo data that may be resolved to generate depth information. In a further example embodiment, the capture device 20 may use point cloud data and target digitization techniques to detect features of a scene and/or user. These techniques are explained in greater detail below in the context of calibrating the different capture devices 20 together.

Each capture device 20 may further include a microphone array 30 including one or more microphones. The microphones of array 30 may include a transducer or sensor that may receive and convert sound into an electrical signal. According to one embodiment, the microphone array 30 may be used to reduce feedback between the capture device 20 and the computing environment 12 in the target recognition, analysis, and tracking system 10. Additionally, the microphone array 30 may be used to receive audio signals that may also be provided by the user to control applications such as game applications, non-game applications, or the like that may be executed by the computing environment 12.

In an example embodiment, each capture device 20 may further include a processor 32 that may be in operative communication with the image camera component 22. The processor 32 may include a standardized processor, a specialized processor, a microprocessor, or the like that may execute instructions that may include instructions for receiving the depth image, determining whether a suitable target may be included in the depth image, converting the suitable target into a skeletal representation or model of the target, or any other suitable instruction.

Each capture device 20 may further include a memory component 34 that may store the instructions that may be executed by the processor 32, images or frames of images captured by the 3-D camera or RGB camera, or any other suitable information, images, or the like. According to an example embodiment, the memory component 34 may include random access memory (RAM), read only memory (ROM), cache, Flash memory, a hard disk, or any other suitable storage component. As shown in FIG. 2, in one embodiment, the memory component 34 may be a separate component in communication with the image camera component 22 and the processor 32. According to another embodiment, the memory component 34 may be integrated into the processor 32 and/or the image camera component 22.

As shown in FIG. 2, each capture device 20 may be in communication with the computing environment 12 via a communication link 36. The communication link 36 may be a wired connection including, for example, a USB connection, a Firewire connection, an Ethernet cable connection, or the like and/or a wireless connection such as a wireless 802.11b, g, a, or n connection. According to one embodiment, the computing environment 12 may provide a master clock to the capture devices 20 that may be used to determine when to capture a scene via the communication link 36 as explained below with respect to the synchronization engine 184.

FIG. 2 shows several components of computing environment 12 which may be used to calibrate relative positions of capture devices 20, and to synchronize the audio and/or visual data obtained from the devices. Such components include a synchronization engine 180, capture device calibration engine 182, image stitching engine 184 and/or acoustic source localization engine 186. These engines may be implemented in software, hardware or a combination of software and hardware. Each of the engines 180 through 186 is explained below.

Additionally, each capture device 20 may provide the depth information and images captured by, for example, the 3-D camera 26 and/or the RGB camera 28, and a skeletal model that may be generated by the capture device 20 to the computing environment 12 via the communication link 36. A variety of known techniques exist for determining whether a target or object detected by capture device 20 corresponds to a human target. Skeletal mapping techniques may then be used to determine various spots on that user's skeleton, joints of the hands, wrists, elbows, knees, nose, ankles, shoulders, and where the pelvis meets the spine. Other techniques include transforming the image into a body model representation of the person and transforming the image into a mesh model representation of the person.

The skeletal model may then be provided to the computing environment 12 such that the computing environment may perform a variety of actions. The computing environment may further determine which controls to perform in an application executing on the computer environment based on, for example, gestures of the user that have been recognized from the skeletal model. For example, as shown, in FIG. 2, the computing environment 12 may include a gesture recognizer engine 190 for determining when the user has performed a predefined gesture as is known in the art.

Figure 3A:
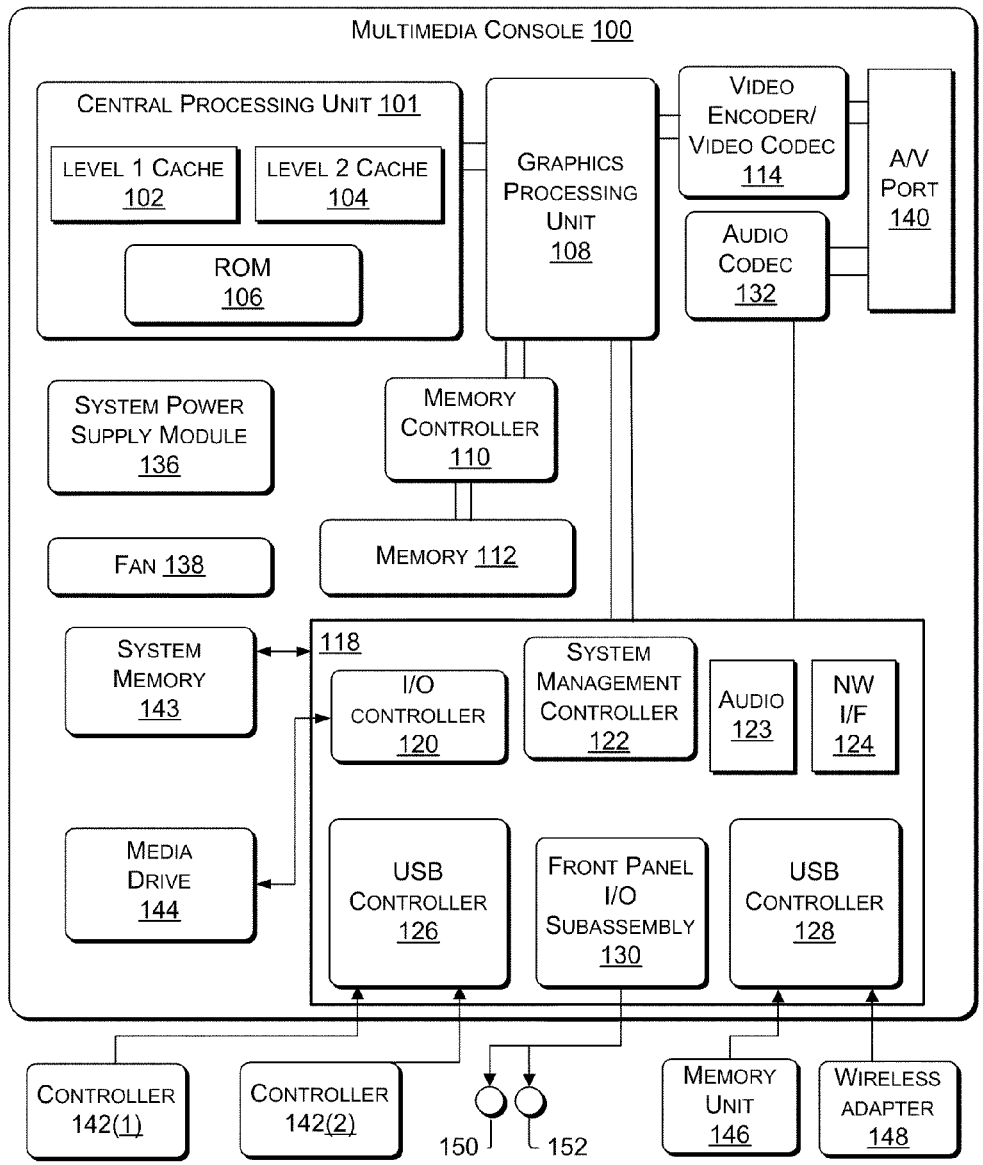
FIG. 3A illustrates an example embodiment of a computing environment that may be used to interpret one or more gestures in a target recognition, analysis, and tracking system.

FIG. 3A illustrates an example embodiment of a computing environment that may be used to interpret one or more positions and motions of a user in a target recognition, analysis, and tracking system. The computing environment such as the computing environment 12 described above with respect to FIGS. 1A-2 may be a multimedia console 100, such as a gaming console. As shown in FIG. 3A, the multimedia console 100 has a central processing unit (CPU) 101 having a level 1 cache 102, a level 2 cache 104, and a flash ROM 106. The level 1 cache 102 and a level 2 cache 104 temporarily store data and hence reduce the number of memory access cycles, thereby improving processing speed and throughput. The CPU 101 may be provided having more than one core, and thus, additional level 1 and level 2 caches 102 and 104. The flash ROM 106 may store executable code that is loaded during an initial phase of a boot process when the multimedia console 100 is powered ON.

A graphics processing unit (GPU) 108 and a video encoder/video codec (coder/decoder) 114 form a video processing pipeline for high speed and high resolution graphics processing. Data is carried from the GPU 108 to the video encoder/video codec 114 via a bus. The video processing pipeline outputs data to an A/V (audio/video) port 140 for transmission to a television or other display. A memory controller 110 is connected to the GPU 108 to facilitate processor access to various types of memory 112, such as, but not limited to, a RAM.

The multimedia console 100 includes an I/O controller 120, a system management controller 122, an audio processing unit 123, a network interface controller 124, a first USB host controller 126, a second USB host controller 128 and a front panel I/O subassembly 130 that are preferably implemented on a module 118. The USB controllers 126 and 128 serve as hosts for peripheral controllers 142(1)-142(2), a wireless adapter 148, and an external memory device 146 (e.g., flash memory, external CD/DVD ROM drive, removable media, etc.). The network interface 124 and/or wireless adapter 148 provide access to a network (e.g., the Internet, home network, etc.) and may be any of a wide variety of various wired or wireless adapter components including an Ethernet card, a modem, a Bluetooth module, a cable modem, and the like.

System memory 143 is provided to store application data that is loaded during the boot process. A media drive 144 is provided and may comprise a DVD/CD drive, hard drive, or other removable media drive, etc. The media drive 144 may be internal or external to the multimedia console 100. Application data may be accessed via the media drive 144 for execution, playback, etc. by the multimedia console 100. The media drive 144 is connected to the I/O controller 120 via a bus, such as a Serial ATA bus or other high speed connection (e.g., IEEE 1394).

The system management controller 122 provides a variety of service functions related to assuring availability of the multimedia console 100. The audio processing unit 123 and an audio codec 132 form a corresponding audio processing pipeline with high fidelity and stereo processing. Audio data is carried between the audio processing unit 123 and the audio codec 132 via a communication link. The audio processing pipeline outputs data to the A/V port 140 for reproduction by an external audio player or device having audio capabilities.

The front panel I/O subassembly 130 supports the functionality of the power button 150 and the eject button 152, as well as any LEDs (light emitting diodes) or other indicators exposed on the outer surface of the multimedia console 100. A system power supply module 136 provides power to the components of the multimedia console 100. A fan 138 cools the circuitry within the multimedia console 100.

The CPU 101, GPU 108, memory controller 110, and various other components within the multimedia console 100 are interconnected via one or more buses, including serial and parallel buses, a memory bus, a peripheral bus, and a processor or local bus using any of a variety of bus architectures. By way of example, such architectures can include a Peripheral Component Interconnects (PCI) bus, PCI-Express bus, etc.

When the multimedia console 100 is powered ON, application data may be loaded from the system memory 143 into memory 112 and/or caches 102, 104 and executed on the CPU 101. The application may present a graphical user interface that provides a consistent user experience when navigating to different media types available on the multimedia console 100. In operation, applications and/or other media contained within the media drive 144 may be launched or played from the media drive 144 to provide additional functionalities to the multimedia console 100.

The multimedia console 100 may be operated as a standalone system by simply connecting the system to a television or other display. In this standalone mode, the multimedia console 100 allows one or more users to interact with the system, watch movies, or listen to music. However, with the integration of broadband connectivity made available through the network interface 124 or the wireless adapter 148, the multimedia console 100 may further be operated as a participant in a larger network community.

When the multimedia console 100 is powered ON, a set amount of hardware resources are reserved for system use by the multimedia console operating system. These resources may include a reservation of memory (e.g., 16 MB), CPU and GPU cycles (e.g., 5%), networking bandwidth (e.g., 8 kbs), etc. Because these resources are reserved at system boot time, the reserved resources do not exist from the application's view.

In particular, the memory reservation preferably is large enough to contain the launch kernel, concurrent system applications and drivers. The CPU reservation is preferably constant such that if the reserved CPU usage is not used by the system applications, an idle thread will consume any unused cycles.

With regard to the GPU reservation, lightweight messages generated by the system applications (e.g., popups) are displayed by using a GPU interrupt to schedule code to render popup into an overlay. The amount of memory required for an overlay area size and the overlay preferably scales with screen resolution. Where a full user interface is used by the concurrent system application, it is preferable to use a resolution independent of the application resolution. A scaler may be used to set this resolution such that the need to change frequency and cause a TV resynch is eliminated.

After the multimedia console 100 boots and system resources are reserved, concurrent system applications execute to provide system functionalities. The system functionalities are encapsulated in a set of system applications that execute within the reserved system resources described above. The operating system kernel identifies threads that are system application threads versus gaming application threads. The system applications are preferably scheduled to run on the CPU 101 at predetermined times and intervals in order to provide a consistent system resource view to the application. The scheduling is to minimize cache disruption for the gaming application running on the console.

When a concurrent system application requires audio, audio processing is scheduled asynchronously to the gaming application due to time sensitivity. A multimedia console application manager (described below) controls the gaming application audio level (e.g., mute, attenuate) when system applications are active.

Input devices (e.g., controllers 142(1) and 142(2)) are shared by gaming applications and system applications. The input devices are not reserved resources, but are to be switched between system applications and the gaming application such that each will have a focus of the device. The application manager preferably controls the switching of input stream, without knowledge of the gaming application's knowledge and a driver maintains state information regarding focus switches. The cameras 26, 28 and capture device 20 may define additional input devices for the console 100.

Figure 3B:
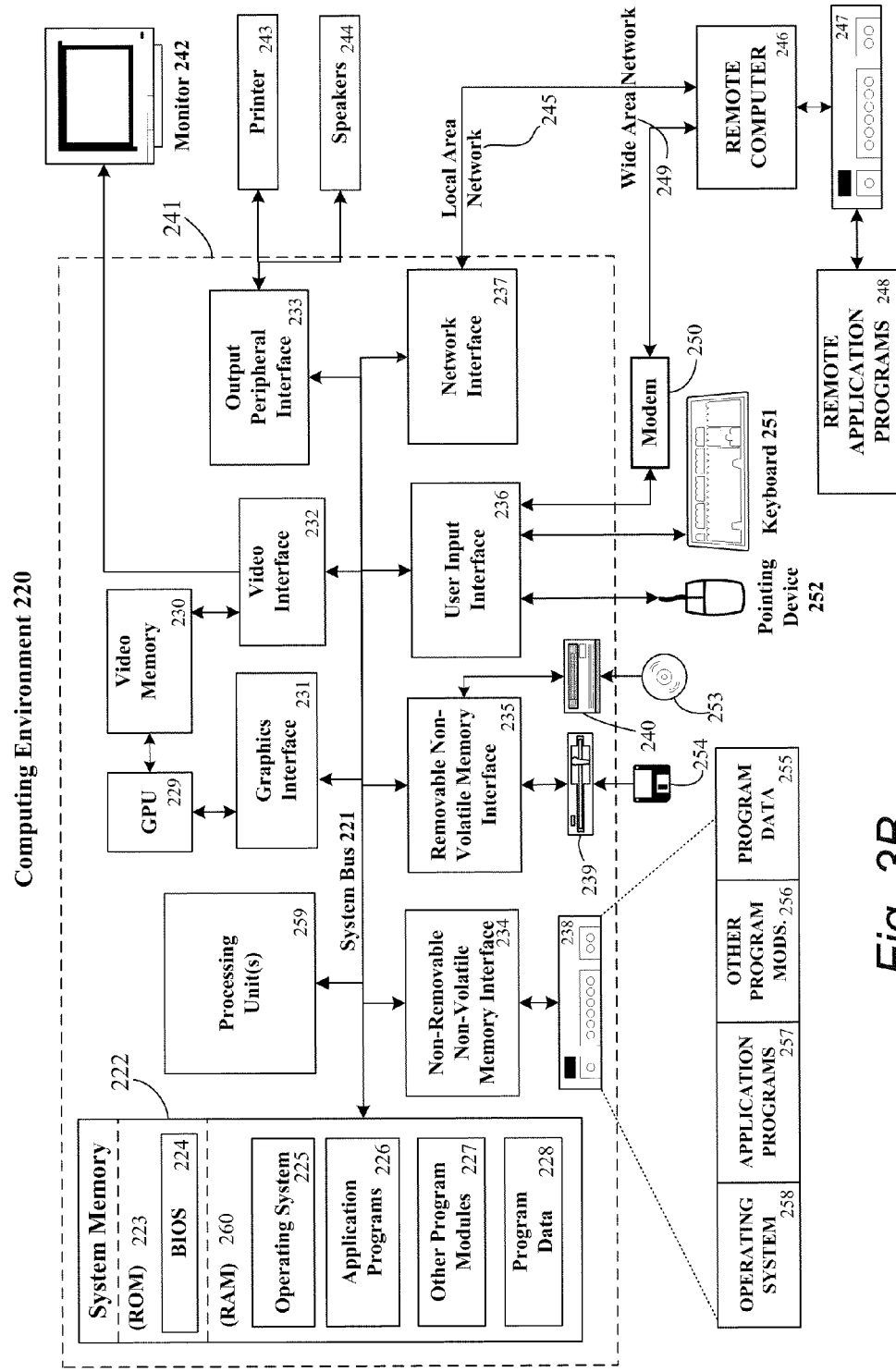
FIG. 3B illustrates another example embodiment of a computing environment that may be used to interpret one or more gestures in a target recognition, analysis, and tracking system.

FIG. 3B illustrates another example embodiment of a computing environment 220 that may be the computing environment 12 shown in FIGS. 1A-2 used to interpret one or more positions and motions in a target recognition, analysis, and tracking system. The computing system environment 220 is only one example of a suitable computing environment and is not intended to suggest any limitation as to the scope of use or functionality of the presently disclosed subject matter. Neither should the computing environment 220 be interpreted as having any dependency or requirement relating to any one or combination of components illustrated in the exemplary operating environment 220. In some embodiments, the various depicted computing elements may include circuitry configured to instantiate specific aspects of the present disclosure. For example, the term circuitry used in the disclosure can include specialized hardware components configured to perform function(s) by firmware or switches. In other example embodiments, the term circuitry can include a general purpose processing unit, memory, etc., configured by software instructions that embody logic operable to perform function(s). In example embodiments where circuitry includes a combination of hardware and software, an implementer may write source code embodying logic and the source code can be compiled into machine readable code that can be processed by the general purpose processing unit. Since one skilled in the art can appreciate that the state of the art has evolved to a point where there is little difference between hardware, software, or a combination of hardware/software, the selection of hardware versus software to effectuate specific functions is a design choice left to an implementer. More specifically, one of skill in the art can appreciate that a software process can be transformed into an equivalent hardware structure, and a hardware structure can itself be transformed into an equivalent software process. Thus, the selection of a hardware implementation versus a software implementation is one of design choice and left to the implementer.

In FIG. 3B, the computing environment 220 comprises a computer 241, which typically includes a variety of computer readable media. Computer readable media can be any available media that can be accessed by computer 241 and includes both volatile and nonvolatile media, removable and non-removable media. The system memory 222 includes computer storage media in the form of volatile and/or nonvolatile memory such as ROM 223 and RAM 260. A basic input/output system 224 (BIOS), containing the basic routines that help to transfer information between elements within computer 241, such as during start-up, is typically stored in ROM 223. RAM 260 typically contains data and/or program modules that are immediately accessible to and/or presently being operated on by processing unit 259. By way of example, and not limitation, FIG. 3B illustrates operating system 225, application programs 226, other program modules 227, and program data 228. FIG. 3B further includes a graphics processor unit (GPU) 229 having an associated video memory 230 for high speed and high resolution graphics processing and storage. The GPU 229 may be connected to the system bus 221 through a graphics interface 231.

The computer 241 may also include other removable/non-removable, volatile/nonvolatile computer storage media. By way of example only, FIG. 3B illustrates a hard disk drive 238 that reads from or writes to non-removable, nonvolatile magnetic media, a magnetic disk drive 239 that reads from or writes to a removable, nonvolatile magnetic disk 254, and an optical disk drive 240 that reads from or writes to a removable, nonvolatile optical disk 253 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 238 is typically connected to the system bus 221 through a non-removable memory interface such as interface 234, and magnetic disk drive 239 and optical disk drive 240 are typically connected to the system bus 221 by a removable memory interface, such as interface 235.

The drives and their associated computer storage media discussed above and illustrated in FIG. 3B, provide storage of computer readable instructions, data structures, program modules and other data for the computer 241. In FIG. 3B, for example, hard disk drive 238 is illustrated as storing operating system 258, application programs 257, other program modules 256, and program data 255. Note that these components can either be the same as or different from operating system 225, application programs 226, other program modules 227, and program data 228. Operating system 258, application programs 257, other program modules 256, and program data 255 are given different numbers here to illustrate that, at a minimum, they are different copies. A user may enter commands and information into the computer 241 through input devices such as a keyboard 251 and a pointing device 252, commonly referred to as a mouse, trackball or touch pad. Other input devices (not shown) may include a microphone, joystick, game pad, satellite dish, scanner, or the like. These and other input devices are often connected to the processing unit 259 through a user input interface 236 that is coupled to the system bus, but may be connected by other interface and bus structures, such as a parallel port, game port or a universal serial bus (USB). The cameras 26, 28 and capture device 20 may define additional input devices for the console 100. A monitor 242 or other type of display device is also connected to the system bus 221 via an interface, such as a video interface 232. In addition to the monitor, computers may also include other peripheral output devices such as speakers 244 and printer 243, which may be connected through an output peripheral interface 233.

The computer 241 may operate in a networked environment using logical connections to one or more remote computers, such as a remote computer 246. The remote computer 246 may be a personal computer, a server, a router, a network PC, a peer device or other common network node, and typically includes many or all of the elements described above relative to the computer 241, although only a memory storage device 247 has been illustrated in FIG. 3B. The logical connections depicted in FIG. 3B include a local area network (LAN) 245 and a wide area network (WAN) 249, but may also include other networks. Such networking environments are commonplace in offices, enterprise-wide computer networks, intranets and the Internet.

When used in a LAN networking environment, the computer 241 is connected to the LAN 245 through a network interface or adapter 237. When used in a WAN networking environment, the computer 241 typically includes a modem 250 or other means for establishing communications over the WAN 249, such as the Internet. The modem 250, which may be internal or external, may be connected to the system bus 221 via the user input interface 236, or other appropriate mechanism. In a networked environment, program modules depicted relative to the computer 241, or portions thereof, may be stored in the remote memory storage device. By way of example, and not limitation, FIG. 3B illustrates remote application programs 248 as residing on memory device 247. It will be appreciated that the network connections shown are exemplary and other means of establishing a communications link between the computers may be used.

Figure 4:
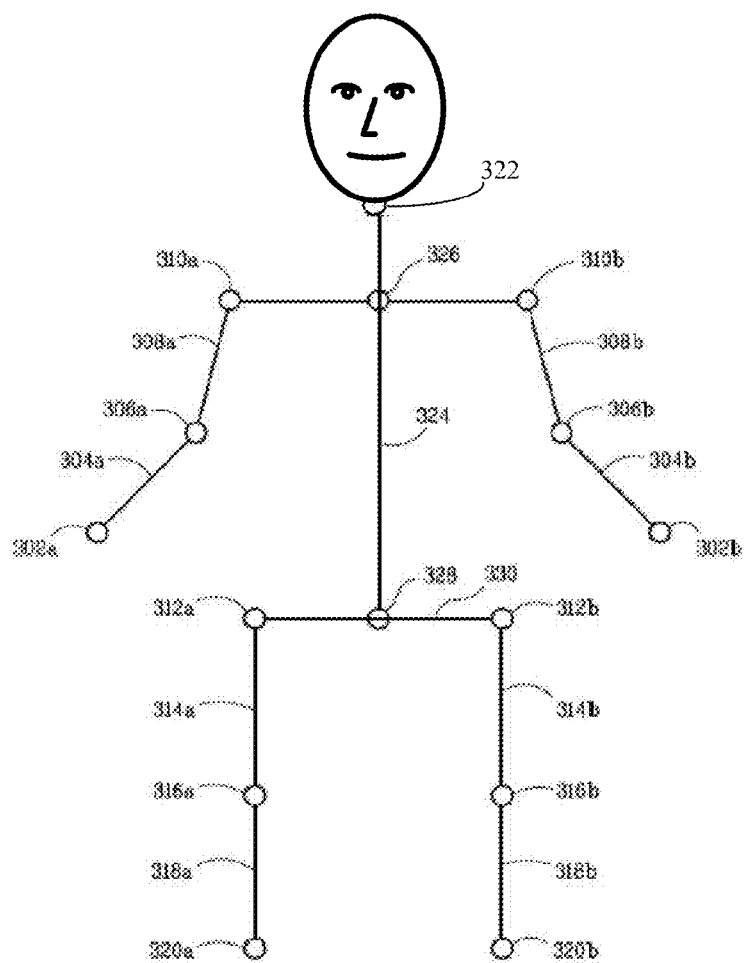
FIG. 4 illustrates a skeletal mapping of a user that has been generated from the target recognition, analysis, and tracking system of FIG. 2.
Figure 5:
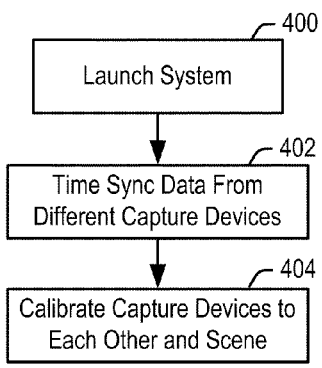
FIG. 5 is high level flowchart of a process for calibrating capture devices to each other and a scene.
Figure 6:
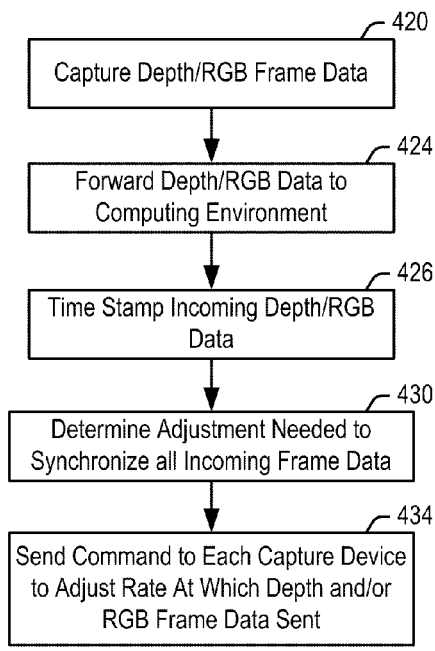
FIG. 6 is a flowchart of a process for synchronizing image data for calibration of capture devices to each other and a scene.

FIG. 4 depicts an example skeletal mapping of a user 18 that may be generated from the capture device 20. In this embodiment, a variety of joints and bones are identified: each hand 302, each forearm 304, each elbow 306, each bicep 308, each shoulder 310, each hip 312, each thigh 314, each knee 316, each foreleg 318, each foot 320, the head 322, the torso 324, the top 326 and the bottom 328 of the spine, and the waist 330. Where more points are tracked, additional features may be identified, such as the bones and joints of the fingers or toes, or individual features of the face, such as the nose and eyes.

As indicated above, the present technology may synchronize two or more capture devices 20 together to provide a composite audio and/or image map for use by a gaming or other application. In embodiments, the capture devices 20 may be placed at positions around a scene to be captured, where the spacing and orientation between capture devices is unknown. In a first aspect of the present technology, the capture devices 20 are calibrated with respect to each other and the scene they are capturing by the synchronization engine 180 and capture device calibration engine 182. The operation of engines 180 and 182 is now explained with reference to the high level flowchart of FIG. 5.

In step 400, the system 10 is launched. At that point, capture devices 20 begin capturing data of a scene and transmitting it to the computing environment 12. The scene captured by the capture devices 20 may not be static. Users and objects may be entering and leaving the scene. Thus, in order to calibrate the different capture devices 20, embodiments of the present technology time synchronize the image data received from the cameras of the different capture devices in step 402 to remove time as a variable. This way, the calibration engine 182 can perform its analysis on the image data from the different devices 20 captured at the same time.

The synchronization step 402 is performed by the synchronization engine 180 in computing device 12. Further details relating to step 402 are now described with reference to the flowchart of FIG. 6. The following description may be applied to synchronization of data received from the depth cameras 26 and RGB cameras 28 of the different capture devices 20. As explained below, embodiments of the present technology use both depth camera data and RGB camera data when calibrating the different capture devices 20 to each other. Accordingly, in such embodiments, a depth camera 26 and RGB camera 28 of a given capture device 20 are synchronized both with respect to each other and with respect to the depth cameras 26 and RGB cameras 28 of other capture devices 20. Thus, all cameras 26 and 28 in all capture devices 20 may be synchronized together. In embodiments, although more difficult, it is conceivable that the calibration engine 182 use data from just the depth camera or just the RGB camera in calibrating the different capture devices 20. In such embodiments, the synchronization engine 180 may only synchronize the cameras used in the calibration process in step 402.

Within each capture device 20, frames of scene information are captured by the depth camera and RGB camera in step 420. In step 424, the depth and RGB frame data for each capture device are transmitted to the computing environment 12. In step 426, the incoming depth/RGB data is time stamped off a single master clock in the computing environment 12. It is understood that, for a given capture device, the depth frame data may be generated and sent in step 426 at a different time than the RGB frame data. If so, the depth and RGB frame data from a given capture device will not have the same time stamps in the computing environment 12 for a given frame of data.

In step 430, the synchronization engine 180 looks at the frame data received from all devices for a given frame number. Using the time stamps for such data for a given frame, as well as the known resolution for each of the cameras, the synchronization engine determines the required time offsets for the depth and RGB data from each device generating the data. From this, the synchronization engine may determine a required adjustment in the timing of each depth and RGB device across all capture devices. The synchronization engine may select as a reference a time stamp from a single device's frame data (e.g., the device that generated the first data for that frame) and set that time stamp as the reference time stamp. The frame data for all other devices may then be adjusted to that reference time stamp. Alternatively, the synchronization engine may generate an internal clock reference, and set the adjustment for all frame data to that internal clock reference.

Once the adjustment for each device is determined in step 430, the synchronization engine may send commands to each device in step 434 to adjust the rate at which that device generates its frame data. There are a variety of mechanisms which may be used for adjusting the generation of frame data. In one embodiment, the synchronization engine may add to or subtract from a blanking interval for the depth devices and RGB devices generating the frame data, so that all frame data from all capture devices is generated and sent at the same time. If the synchronization engine 180 needs to have frames from one device come in sooner, for example to avoid buffer underflows, it can send a command to the device to reduce the blanking interval for that device. If the synchronization engine 180 needs to have the frame data for a device generated later, for example to avoid buffer overflows, it can increase the vertical blanking interval for that device.

Further details relating to the operation of synchronization engine 180 in step 402 are disclosed in applicant's co-pending U.S. patent application Ser. No. 12/772,802, entitled "Heterogeneous Image Sensor Synchronization," filed May 3, 2010, which application is incorporated herein by reference in its entirety. Given the disclosure herein, those of skill in the art will appreciate a variety of other operations which may be used for synchronizing the different depth and RGB devices together for the calibration process.

The synchronization steps may be employed as part of the initial capture device calibration process as the capture devices 20 are capturing a dynamic scene with users and/or objects coming into and leaving the scene. In further embodiments, it may be known that there is no movement into and out of a scene. In such embodiments, the synchronization steps of the initial calibration process may be omitted. For example, the operating system of the system 10 may have a calibration routine which walks a user through the calibration process. In such embodiments, the calibration routine may tell the user to stay still and/or to move only at certain times and in defined ways, while the capture devices 20 are calibrated. In such embodiments, the synchronization steps associated with the calibration process may optionally be omitted. Where omitted in the calibration process, the synchronization steps may still be employed to handle motion during scene stitching after the calibration process as explained below.

In further embodiments, it is conceivable that synchronization steps may also be omitted from the initial calibration process, even where there is dynamic movements into or out of the scene. Such embodiments may make use of motion vectors to predict locations of captured depth and/or RGB data points at times other than the capture point. While computationally difficult and processing intensive, such embodiments are possible.

Returning now to FIG. 5, once image data frames are synchronized for a moving scene of data in step 402, the capture devices may be calibrated to each other and the scene in step 404. In the following description, a z-axis is defined straight out from a camera lens, and the x-axis and y-axis are horizontal and vertical offsets, respectively, from the z-axis. This definition of x, y and z axes is by way of example only, and the axes may be oriented differently in further embodiments. Each capture device may have an x, y, z Cartesian space that is different than that of other capture devices. As explained hereinafter, once all capture devices are calibrated, a single 3-D real world Cartesian coordinate system may be defined which includes all of the capture devices 20.

In embodiments, the calibration operation is performed by calibration engine 182 using both the depth information and RGB information from the different capture devices. Depth cameras provide information about an x, y and z position of points in an image, but may have low resolution. RGB cameras do not provide depth information in the z direction, but typically have high resolution and texture for discerning discontinuities, or cues, used to correlate one capture device's view to another. Accordingly, embodiments of the present technology may use both depth and RGB cameras from a capture device for the calibration process.

However, as noted above, while more computationally intensive and depending on objects in the scene, it may be possible to calibrate the capture devices to each other and a scene using only depth information from two or more of the capture devices. Similarly, though more computationally intensive still and depending on the objects in the scene, it may be possible to calibrate devices to each other using only RGB information from two or more capture devices. Technology for calibrating camera views using RGB information alone is described for example in U.S. Patent Publication No. 2007/0110338, entitled "Navigating Images Using Image Based Geometric Alignment and Object Based Controls," published May 17, 2007, which publication is used in the technology of Photosynth™ image recognition software from Microsoft Corporation, and which publication is incorporated herein by reference in its entirety.

Figure 7:
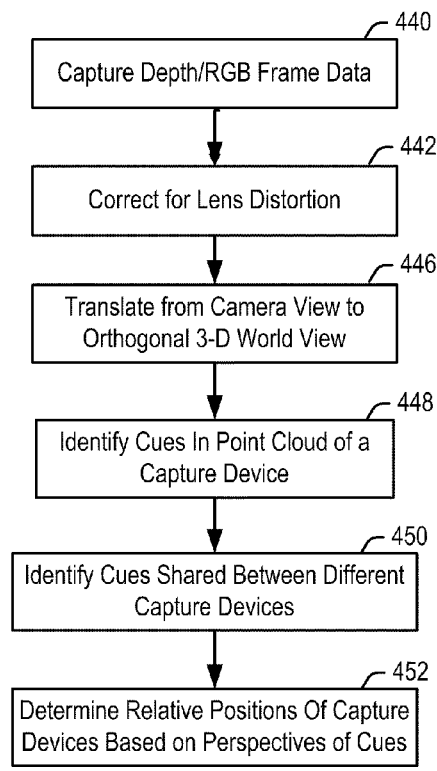
FIG. 7 is a flowchart with further detail of a process for calibrating capture devices to each other and a scene.

Further details relating to an embodiment of the calibration of the capture devices 20 by the calibration engine 182 using depth and RGB data is now explained with reference to the flowchart of FIG. 7. In a step 440, the different capture devices 20 capture depth and RGB image data from a scene. In step 442, the camera view of each depth camera and RGB camera for the different capture devices is converted from a camera-centric view to an orthogonal 3-D world view specific to the generating camera. Some depth cameras measure captured data using a perpendicular frame of reference. That is, the camera defines a plane in a z-direction which increases for objects that are farther away from the camera. The x and y dimensions represent the horizontal and vertical variance from the z-axis. Other depth cameras measure captured data using a radial frame of reference. That is, the camera measures vectors having a first point ($x_1$, $y_1$, $z_1$) at the camera and a second point ($x_2$, $y_2$, $z_2$) at an object.

Regardless of how a camera measures its image data points, ideally the distance between any two adjacent coordinates in the measurement is the same. However, due to camera lens distortion, this will likely not be the case. Accordingly, in step 442, the calibration engine 182 may next correct for camera distortion for both depth and RGB cameras in the capture devices 20 in the system 10. The distortion of a given camera (depth or RGB) may be a known property provided by the camera manufacturer. If not, algorithms are known for calculating a camera's distortion, including for example imaging an object of known dimensions such as a checker board pattern at different locations within a camera's field of view. The deviations in the camera view coordinates of points in that image will be the result of camera lens distortion. Once the degree of lens distortion is known, distortion may be corrected by known inverse matrix transformations that result in a uniform camera view map of points in a point cloud for a given capture device.

The calibration engine 182 may next translate the distortion-corrected image data points captured by a capture device from the camera view to an orthogonal 3-D world view in step 446. This orthogonal 3-D world view is a point cloud map of all data captured by a capture device 20 in an orthogonal x, y, z Cartesian coordinate system with respect to the capture device (e.g., the capture device may be at (0, 0, 0) in the 3-D world view). The matrix transformation equations for translating camera view to an orthogonal 3-D world view are known. See, for example, David H. Eberly, "3d Game Engine Design: A Practical Approach To Real-Time Computer Graphics," Morgan Kaufman Publishers (2000), which publication is incorporated herein by reference in its entirety.

Data from a capture device depth camera 26 may be sufficient to construct the orthogonal 3-D world view in step 446. However, data from a capture device RGB camera 28 may also be used in constructing the 3-D world view in step 446. RGB cameras return a 2-D map of data points, so it is computationally more difficult to derive a 3-D world map from RGB data alone. However, depending on the objects in the scene, it may be possible to construct a 3-D world map from RGB data. See, for example, U.S. Patent Publication No. 2007/0110338, previously incorporated by reference.

Each capture device 20 in a system 10 may construct an orthogonal 3-D world view in step 446. The x, y, z world coordinates of data points from a given capture device are still from the perspective of that capture device at the conclusion of step 446, and not yet correlated to the x, y, z world coordinates of data points from other capture devices in the system 10. In further embodiments, the step of correcting for camera lens distortion may be performed after the step 446 of transforming camera view to the orthogonal 3-D world view.

The next step is to translate the various orthogonal 3-D world views of the different capture devices 20 into a single overall 3-D world view shared by all capture devices 20 in system 10. To accomplish this, embodiments of the calibration engine 182 next look for key-point discontinuities, or cues, in the point clouds of the world views of the respective capture devices in step 448, and then identifies cues that are the same between different point clouds of different capture devices in step 450. Once the calibration engine 182 is able to determine that two world views of two different capture devices include the same cues, the engine 182 is able to determine the position, orientation and focal length of the two capture devices with respect to each other and the cues in step 552. In embodiments, not all capture devices 20 in system 10 will share the same common cues. However, as long as a first and second capture device have shared cues, and a second and third capture device have shared cues, the calibration engine is able to determine the positions, orientations and focal lengths of the first, second and third capture devices relative to each other and a single, overall 3-D world view. The same is true for additional capture devices.

The first step 448 in this process is to identify cues in a 3-D real world view point cloud for each capture device. A cue may be a data point that is discontinuous with neighboring points, and hence is easily identified between point clouds from different capture devices. Ideally, a number of such cues are identified within each point cloud, and may possibly define an edge and/or a corner of an object within the point cloud. Aspects of other objects within an image point cloud may be cues as well. Various known algorithms exist for identifying cues from an image point cloud. Such algorithms are set forth for example in Mikolajczyk, K., and Schmid, C., "A Performance Evaluation Of Local Descriptors," *IEEE Transactions on Pattern Analysis & Machine Intelligence*, 27, 10, 1615-1630. (2005), which paper is incorporated by reference herein in its entirety. A further method of detecting cues with image data is the Scale-Invariant Feature Transform (SIFT) algorithm. The SIFT algorithm is described for example in U.S. Pat. No. 6,711,293, entitled, "Method and Apparatus for Identifying Scale Invariant Features in an Image and Use of Same for Locating an Object in an Image," issued Mar. 23, 2004 to David G. Lowe, which patent is incorporated by reference herein in its entirety. Another cue detector method is the Maximally Stable Extremal Regions (MSER) algorithm. The MSER algorithm is described for example in the paper by J. Matas, O. Chum, M. Urba, and T. Pajdla, "Robust Wide Baseline Stereo From Maximally Stable Extremal Regions," *Proc. of British Machine Vision Conference*, pages 384-396 (2002), which paper is incorporated by reference herein in its entirety.

In step 450, cues which are shared between point clouds from two or more capture devices are identified. Conceptually, where a first set of vectors exist between a first capture device and a set of cues in the first capture device's Cartesian coordinate system, and a second set of vectors exist between a second capture device and that same set of cues in the second capture device's Cartesian coordinate system, the two systems may be resolved with respect to each other into a single Cartesian coordinate system including both capture devices. A number of known techniques exist for finding shared cues between point clouds from two or more capture devices. Such techniques are shown for example in Arya, S., Mount, D. M., Netanyahu, N. S., Silverman, R., and Wu, A. Y., "An Optimal Algorithm For Approximate Nearest Neighbor Searching Fixed Dimensions," *Journal of the ACM* 45, 6, 891-923 (1998), which paper is incorporated by reference herein in its entirety. Other techniques can be used instead of, or in addition to, the approximate nearest neighbor solution of Arya et al., incorporated above, including but not limited to hashing or context-sensitive hashing.

Where the point clouds from two different capture devices share a large enough number of matched cues, a matrix correlating the two point clouds together may be estimated, for example by Random Sampling Consensus (RANSAC), or a variety of other estimation techniques. Matches that are outliers to the recovered fundamental matrix may then be removed. After finding a set of assumed, geometrically consistent matches between a pair of point clouds, the matches may be organized into a set of tracks for the respective point clouds, where a track is a set of mutually matching cues between point clouds. A first track in the set may contain a projection of each common cue in the first point cloud. A second track in the set may contain a projection of each common cue in the second point cloud.

If the cues in respective point clouds form the vertex set of a graph, and there is an edge in the graph between each pair of matching cues, then every connected component of this graph comprises a track. However, the tracks associated with some connected components might be inconsistent; in particular, a track is inconsistent if it contains more than one cue for the same image. In embodiments, only the consistent tracks containing at least two cues are kept for the step 452 of determining relative capture device position, described below.

Using the information from steps 448 and 450, the point clouds from different capture devices may be resolved into a single point cloud in a single orthogonal 3-D real world view. The positions and orientations of all capture devices are calibrated with respect to this single point cloud and single orthogonal 3-D real world view. In order to resolve the various point clouds together, the projections of the cues in the set of tracks for two point clouds are analyzed. From these projections, the calibration engine 182 can determine the perspective of a first capture device with respect to the cues, and can also determine the perspective of a second capture device with respect to the cues. From that, the calibration engine 182 can resolve the point clouds into a best estimate of a single point cloud and single orthogonal 3-D real world view containing the cues and other data points from both point clouds.

This process is repeated for any other capture devices, until the single orthogonal 3-D real world view includes all capture devices 20. Once this is done, the calibration engine can determine the relative positions and orientations of the capture devices relative to the single orthogonal 3-D real world view and each other. The calibration engine can further determine the focal length of each capture device with respect to the single orthogonal 3-D real world view.

In the embodiments described above, the capture devices 20 may be placed anywhere around a play space or scene and the positions at which the devices are placed need not be known. The system will calibrate those positions as explained above. In a further embodiment, the positions and orientations of two or more capture devices may be known relative to each other when placed around a scene. For example, the fixture 23 of FIG. 1C may be used to fix the positions of two capture devices with respect to each other. Instead of a fixture 23, gyroscopes and/or accelerometers may be placed on capture devices to provide their positions and orientations. In such embodiments, the calibration steps with respect to the fixed capture devices may be skipped, or simplified as explained below.

While the above components aid in fixing the position of two or more capture devices with respect to each other, they may not have sufficient accuracy. The cameras in the different capture devices may have different characteristics. The fixture 23 may have tolerance variations in the positions and/or orientations of the capture devices. Gyroscopes and accelerometers may suffer from drift or otherwise may not be properly calibrated. Accordingly, it may be desirable to perform the calibration steps described above, treating the two capture devices 20 in the fixture 23 as being at unknown positions with respect to each other. In embodiments, a full calibration as described above may be performed. In a further embodiment, having at least a general idea of where the capture devices 20 are with respect to each other may allow the calibration process to be simplified. For example, the number of cues used to calibrate the respective positions of the capture devices 20 in the fixture may be reduced in comparison to the number of cues used to calibrate capture devices at unknown positions.

The calibration steps performed by the calibration engine 182 and described above with respect to FIGS. 5 through 7 may be performed once, upon initial launch of the system 10. The users and objects within the scene may change, and thus the point clouds generated by the respective capture devices may change, but the calibration of the cameras with respect to each other may stay the same. In embodiments, the calibration engine may continue to gather data regarding cues from the point clouds of various capture devices, and in the event the calibration engine identifies better cues from two or more capture devices, it may repeat the above steps in an attempt to improve the calibration of the capture devices.

As described hereinafter, the views of the scene from the various capture devices may be stitched together and it is expected that shared data points from overlapping views from different capture devices will be generally coextensive with each other. However, it may happen that a capture device is knocked or is otherwise moved, in which case the alignment of shared data points will be off by more than an expected margin of error. In such instances, the system may repeat the above-described calibration steps to once again calibrate the capture devices in system 10 to each other and the scene.

Once the positions of the capture devices have been calibrated, the different capture devices may be used in normal interaction with the system 10 to capture data about the scene. This data is stitched together into a single point cloud, representing a single view, and including data from all capture devices. Such a system provides advantages over a conventional single capture device system. For example, where areas may be occluded from the view of a single capture device, this likelihood is reduced when using multiple capture devices. Similarly, the size of the play space or scene may be increased. Furthermore, while a single capture device views a scene with a single resolution, multiple capture devices may include a first wide-angle capture device for capturing the whole scene, and a second capture device may provide a high resolution image of a small portion of the scene. These features are explained below.

In normal usage after calibration, image data from the different capture devices 20 may be captured in step 460. As there may be movement in and out of a scene during normal usage, the data frames from each camera may be synchronized to each other in step 464. The synchronization steps here may be same as described above with respect to FIG. 6 during the initial calibration process. Thus, the data used from the various cameras in stitching together a composite image is captured at the same time. Each frame of data from the different cameras must also be corrected for lens distortion as described above, so that the distance between any two coordinate points in the 3-D real world view are equidistant. In step 466, the images from each of the cameras, both depth and RGB may be corrected for distortion, for example as described above with respect to step 442 of FIG. 7.

In step 468, the stitching engine 184 may then take the distortion-corrected views captured from the different capture devices and translate them to a single common view of the scene. In particular, once the capture devices 20 are calibrated, and the positions of all capture devices are known with respect to each other and the scene, the view from the capture devices may be translated by known matrices into a view of the scene from any perspective. Accordingly, in step 468, the view from each of the capture devices is translated to a view from a single, common predefined perspective, i.e., from a common position and common orientation (pitch, roll and yaw). The RGB data from a given capture device is registered to the depth data, so that the translated view of a given capture device has the correct depth and RGB data. This view may be a view from one of the capture devices, or it may be any other view of the scene that is not captured by any capture device.

Once translated to a single, common perspective, the views from the different capture devices may be stitched together in step 470 by the stitching engine 184. As noted, this stitching may involve stitching a zoomed image from one capture device overlapped onto a wide angle image including the zoomed image. Alternatively, this stitching may involve stitching together two images from two different capture devices that overlap along a boundary area.

FIG. 9 provides additional detail regarding stitching step 470. Theoretically, the data from the different capture devices 20, translated to the same view, should align with each other with the correct color values. In step 480, the stitching engine may determine whether overlapping points in the views of the different capture devices align. If yes, the stitching engine 184 may stitch the images together seamlessly in step 482. However, if for some reason the views do not match up, the stitching engine may choose to use one view over the other as follows.

In one embodiment, the stitching engine may assign a weighted value to the views of a scene from the different capture devices 20 in step 486. The weighted value may be based on several criteria, including the spatial position of the view to the portion of the scene captured, camera characteristics of the camera that generated the view, the resolution of the camera that created the view, luminance, lighting conditions within the scene (e.g., is a capture device pointed at a sunlit window which adversely affects the scene capture), and whether one or more objects in a particular view are occluded. Regarding occlusion, the stitching engine 184 knows the 3-D position of objects and users within a view, and can therefore determine whether a camera's view of a first object/user is blocked by a second object/user. Other criteria may be employed in assigning a weighted value to a camera's view. Each of the above criteria may be assigned an arbitrary weight, with more important criteria receiving higher weights than less important criteria.

These criteria may be weighted for each view in step 486 to arrive at a confidence value for a given view. The view having the highest confidence value is used in step 488. Using the selected view, the views may be stitched together in step 490. Where a view from a first capture device transitions to the view of another capture device, various known blending and smoothing techniques may be employed to provide a smooth and seamless transition. See U.S. Publication No. 2007/011033, previously incorporated by reference. Moreover, it may happen that there are gaps within a scene which are not captured by any of the capture devices. Techniques are known for filling in these gaps, using depth and image data from the images bordering the gaps. Such techniques are also disclosed in U.S. Publication No. 2007/011033, previously incorporated by reference.

Returning to FIG. 8, after the point cloud for a reconciled and composite image of a scene from all the cameras is stitched together, the image may be rendered in step 472 by an application running on the computing environment 12. Instead of, or in addition to, rendering the composite image, the application may use the point cloud data in any of a variety of other ways, as determined by the application. In further embodiments, it is understood that raw data from the various capture devices may be fed to the application running on the computing environment 12, for that application to process as described above or in other ways.

In addition to image data, the use and synchronization of multiple capture devices improves the sound quality, noise cancellation and/or acoustic localization of audio coming from the scene. As indicated above, each image capture device 20 may include a microphone array 30. The microphones in the array are spaced from each other within a capture device, but are not as effective at improving baseline sound quality, noise cancellation and acoustic localization as microphone arrays in separate spaced capture devices 20.

Referring now to FIG. 10, audio data may be captured in step 500 from the microphone arrays in the various capture devices 20. Techniques are known for differentiating sounds picked up by the microphones to determine whether one or more of the sounds is a human voice. Microphone array 30 may also include various known filters, such as a high pass filter, to attenuate low frequency noise which may be detected by the microphone array 30.

The arrays 30 are also able to determine the orientation of the perceived audio sources relative to each other, and are able to calculate the angle of each audio source relative to the microphone arrays using acoustic localization techniques. The acoustic source localization engine 186 may thus be used to determine the location of source(s) of the audio data from the scene in step 504. The acoustic source localization engine 186 may employ various known acoustic localization techniques. One embodiment may employ a time difference of arrivals (TDOA) technique having a first step of determining a set of TDOAs among different microphone pairs of the different microphones in the arrays 30. That is, for each of a set of microphone pairs, the relative time difference between the arrival of the acoustic source signal at each of the microphones in the pair is determined For example, the TDOA for two microphones i and j measuring the location, s, of an acoustic source may be determined by:

$$TDOA_{ij} = (|s - m_i| - |s - m_j|)/c$$

where $m_i$ is the position of the ith microphone, $m_j$ is the position of the jth microphone and c is the speed of sound.

TDOA techniques further include a second step of using the determined TDOA data and the microphone array geometry learned in the initial capture device calibration phase to estimate the location of an acoustic source. This second step may be performed by a variety of known methods including for example the maximum likelihood method, the triangulation method, the spherical intersection method, and the spherical interpolation method. Having a variety of microphones, spaced at different locations around a scene, greatly enhances the ability of the above-described system to locate the source of a sound.

In step 508, the image devices may indicate that there is a single person at the location indicated to be the acoustic source. In such an event, assuming there are no other people or sources of the sound in that vicinity, the acoustic source localization engine 186 may positively identify that sound as having come from the person at that location. This is one method of identifying a user's voice, which may then be stored for future reference. Likewise, the acoustic source localization engine 186 may determine that a sound is coming from a location where there are no users, speakers or other sound source used in the application running on computing environment. Where an acoustic source is determined to be unrelated to the application running on computing environment 12, the acoustic source localization engine 186 may treat that sound as noise, and cancel the sound in step 510.

The TDOA method is one of a number of known methods which may be employed to locate the source of a perceived voice. Others include steered beamformer-based techniques and high-resolution spectral estimation-based techniques. Further details relating to microphone systems for acoustic localization may be found for example in U.S. Pat. No. 6,826,284, entitled "Method and Apparatus for Passive Acoustic Source Localization for Video Camera Steering Applications," and in a published paper by H. Wang and P. Chu, "Voice Source Localization for Automatic Camera Pointing System In Videoconferencing, *Proc. IEEE Int. Conf. Acoustics, Speech, and Signal Processing* (ICASSP), Munich, Germany, Apr. 1997, pp. 187-190. The above patent and paper are hereby incorporated by reference herein in their entirety.

In addition to acoustic source localization techniques described above (possibly performed by steered beamforming), beamforming techniques may also be used in embodiments to improve the signal-to-noise ratio of a received signal in step 512. Once the source of an acoustic signal is identified, and its distance from the various microphones in the capture devices calculated, beamforming techniques may be used to strengthen the signal to noise ratio. In particular, once the distance from a source to the various microphones is determined, the signal reaching each microphone may be phase shifted by the equivalent speed of sound for a particular elevation and temperature at which system 10 is operating, with the result that the signal reaches each microphone in phase. By this beamforming process, and by additionally augmenting the gain for microphones that are farther from the acoustic source, the phase may be shifted so that all signal wavefronts are aligned on receipt in the microphones, and the signal is strengthened relative to any noise in that signal.

Beamforming to improve signal-to-noise ratio as described above requires tight tolerance control and knowledge of the positions of the respective microphones used in the beamforming processes, for example to within a few millimeters. It is also important to tightly control the clock timing to provide the correct phase shift for each microphone. As many gaming systems do not have the ability to carry out beamforming to such exacting standards, step 512 may be skipped in embodiments of the present technology, as indicated by the dashed lines in FIG. 10.

The foregoing detailed description of the inventive system has been presented for purposes of illustration and description. It is not intended to be exhaustive or to limit the inventive system to the precise form disclosed. Many modifications and variations are possible in light of the above teaching. The described embodiments were chosen in order to best explain the principles of the inventive system and its practical application to thereby enable others skilled in the art to best utilize the inventive system in various embodiments and with various modifications as are suited to the particular use contemplated. It is intended that the scope of the inventive system be defined by the claims appended hereto.

What is claimed:

1. A method for synthesizing information for a scene from multiple sources, wherein the sources are capture devices, comprising:
    a) receiving scene information from a first source and a second source, the first and second sources spatially separated from each other and the scene;
    b) determining a position for each of the first and second sources from the scene information and one or more cues detected in common from the scene by the first and second sources;
    c) creating a representation of the scene based on the positions of the first and second sources determined in said step b) and the scene information received from the first and second sources.

2. The method of claim 1, said step a) of receiving scene information comprising receiving image data from the first and second sources.

3. The method of claim 2, said step a) of receiving image data from the first and second sources comprising the step of time synchronizing the image data received from the first source to the image data received from the second source.

4. The method of claim 2, further comprising the step d) of correcting lens distortion in the image data from the first and second sources prior to said step b) of determining the position for each of the first and second sources.

5. The method of claim 1, said step c) further comprising the step of creating a representation of the scene based on translating the scene information from the first and second sources to a common frame of reference including the first and second sources.

6. The method of claim 1, said step b) comprising the step of determining the position for each of the first and second sources from image depth data included within the scene information.

7. The method of claim 1, said step b) comprising the step of determining the position for each of the first and second sources from RGB data included within the scene information.

8. The method of claim 1, said step a) comprising the step of receiving an audio signal from the scene, the method further comprising the step e) of determining a location of the audio signal based in part on said step b) of determining a position for each of the first and second sources.

9. The method of claim 1, wherein positions of the first and second sources are fixed with respect to each other.

10. A method for synthesizing information for a scene from multiple sources, wherein the sources are capture devices, comprising:
    a) receiving scene information from a first source and a second source, an initial position of the first source being unknown with respect to the second source, the first and second sources spatially separated from each other and the scene, the scene information including at least one of image depth data and RGB data;
    b) determining a position for each of the first and second sources from at least one of the image data and RGB data, together with the scene information shared in common from the scene by the first and second sources; and c) creating a representation of the scene based on the positions of the first and second sources determined in said step b) and the scene information received from the first and second sources.

11. The method of claim 10, said step c) comprising the step of stitching together a first portion of the scene representation from the first source with a second portion of the scene representation from the second source.

12. The method of claim 11, said step of stitching together a first portion of the scene representation with a second portion of the scene representation comprising the step of assigning a confidence value to the first and second portions of the scene and using the first or second portion having the higher confidence value for an area of overlap between the first portion and the second portion.

13. The method of claim 10, said step a) of receiving image data from the first and second sources comprising the step of time synchronizing the image data received from the first source to the image data received from the second source.

14. The method of claim 10, said step a) comprising the step of receiving an audio signal from the scene, the method further comprising the step e) of determining a location of the audio signal based in part on said step b) of determining a position for each of the first and second sources.

15. A method for synthesizing information for a play space in a gaming application from multiple capture devices, capture devices in the multiple capture devices including a depth camera, an RGB camera and at least one microphone, comprising:
   a) receiving image depth data and RGB depth data from a first capture device and a second capture device, the image depth data and the RGB depth data from the first and second capture devices being time synchronized together, the first and second capture devices spatially separated from each other and the play space;
   b) determining a position and orientation for each of the first and second capture devices from a combination of the synchronized image depth data and RGB data, together with a plurality of cues detected in common from the play space by the first and second capture devices;
   c) creating a representation of the play space based on the positions of the first and the second capture devices determined in said step b) and the image depth data and RGB depth data received from the first and second capture devices;
   d) stitching together a first portion of the play space representation from the first capture device with a second portion of the play space representation from the second capture device; and
   e) rendering the representation of the play space on a display associated with the first and second capture devices.

16. The method of claim 15, further comprising the step of associating a voice detected by the first and second capture devices with a user by locating a source of the voice and determining the presence of the user at the source of the voice via the image depth data and/or the RGB data.

17. The method of claim 15, further comprising the step of using the image depth data and RGB data from the first capture device to fill in an area of the representation of the play space which was occluded from view from the second capture device.

18. The method of claim 15, said step of rendering the representation of the play space comprising the step of rendering the representation of the play space from a perspective not captured by the first or second capture device or any of the multiple capture devices.

19. The method of claim 15, the first capture device and second capture device together enlarging an area of the play space that could be captured by the first and second capture devices alone.

20. The method of claim 15, the first capture device capturing a wide angle view of the play space at a first resolution and the second capture device capturing an image of a select area of the play space at a second resolution, the second resolution higher than the first resolution.

* * * * *